United States Patent

[11] 3,590,772

| [72] | Inventor | Jay D. Boone |
| | | Seeley, Calif. |
| [21] | Appl. No. | 718,762 |
| [22] | Filed | Apr. 4, 1968 |
| [45] | Patented | July 6, 1971 |
| [73] | Assignee | The United States of America as represented by the Secretary of the Navy |

[54] PARACHUTE APPARATUS AND NONDESTRUCTIVE METHOD OF TESTING SAME
11 Claims, 8 Drawing Figs.

[52] U.S. Cl. .................................................. 116/114,
8/74, 73/159, 116/114 AJ, 250/83
[51] Int. Cl. .................................................... G01d 21/00
[50] Field of Search.......................................... 116/114,
114.19, 114.20; 250/83, 83 CD; 244/142, 145;
350/160, 160 P; 73/159, 150; 8/74, 165

[56] References Cited
UNITED STATES PATENTS

| 1,845,835 | 2/1932 | Frankenburger et al. | 250/83 |
| 2,949,880 | 8/1960 | Fromer | 250/83 X |
| 3,065,083 | 11/1962 | Gessler | 116/114.20 UX |
| 3,194,963 | 7/1965 | McKee | 250/83 |
| 3,405,555 | 10/1968 | Wissinger et al. | 73/159 |
| 3,449,572 | 6/1969 | Sylvester et al. | 250/83 |

OTHER REFERENCES
Publication: AMERICAN DYESTUFF REPORTER, December 5, 1966 pages 91 to 98

Primary Examiner—Louis J. Capozi
Attorneys—R. S. Sciascia and G. J. Ruben

ABSTRACT: The breaking strength of parachute materials degrades when the materials are exposed to sunlight. Certain dyestuffs also are sensitive to sunlight and exhibit color variations upon exposure. By selecting the proper dyestuff with regard to the minimum acceptable degradation of breaking strength, the degree of degradation can be ascertained nondestructively by detecting color variations in the dyestuff. Various techniques can be employed to permit reliable detection.

PATENTED JUL 6 1971

INVENTOR.
JAY D. BOONE
BY
*Paul B Fritschen*
ATTORNEYS

INVENTOR.
JAY D. BOONE

PARACHUTE APPARATUS AND NONDESTRUCTIVE METHOD OF TESTING SAME

The invention described herein may be manufactured and used by or for the Government of the United States of America for governmental purposes without the payment of any royalties thereon or therefor.

BACKGROUND OF THE INVENTION

The present invention relates to nondestructive testing methods and, particularly, to the nondestructive testing of parachute materials.

As far as is presently known, no nondestructive field tests for degradation in the textile components of survival and escape equipment have proven practicable. It, of course, is well known that parachute materials, such as the nylon canopies, webbings, suspension lines, etc., degrade significantly when exposed to sunlight and eventually the breaking strength of these materials is reduced to a point at which further use is dangerous.

At this point which can be called the maximum acceptable degree of degradation, the parachutes must be taken out of service. Since, in the past, this maximum acceptable degree of degradation was determinable only by guess work, many parachutes either were discarded before their safe period of usefulness had been reached or, in some instances, or unsafe parachutes were continued in use. The inability to achieve a reliable nondestructive field test has resulted, on the one hand, in substantial waste and unnecessary expense, and, on the other, in unnecessary risks to human life.

OBJECTS OF THE INVENTION

It is therefore the primary object of the present invention to provide a reliable, nondestructive field test for determining when the textile materials of parachute components have reached their maximum acceptable degree of degradation in breaking strength.

A related object is to provide a means and method permitting some visual detection of the degradation and, in a manner to be described, the successful accomplishment of this object features the combined use of ultra-violet sensitive and insensitive dyestuffs.

A further object is to provide a parachute constructed in a manner capable of permitting the visual detection of the degradation.

Further objects are to permit the accomplishment of the foregoing objects in a simple, inexpensive and reliable manner which does not involve any particular skills and which readily can be performed in the field.

Other objects and their attendant features will become more apparent in the description which is to follow.

BRIEF SUMMARY OF THE INVENTION

The present invention is predicated upon the finding that degradation in the breaking strength of parachute materials due to exposure to sunlight can be reliably measured as a function of the fading or change in color of selective dyestuffs. Accordingly, the present method contemplates the steps of first ascertaining, through destructive testing techniques, a maximum degree of degradation acceptable for the particular textile material which forms the component to be tested. Another sample of the same material then may be exposed to sunlight to determine from the exposure the specific amount of energy, in Langleys or in some other quantitative unit of measurement, required to degrade this sample to the previously ascertained maximum acceptable degree of degradation. Based upon this data, a dyestuff is selected and used for forming a section of the parachute component. The selection takes into consideration the initial color or pigment of the dyestuff to the specific amount of energy needed to produce the degradation of the breaking strength. More specifically, the dyestuff must have a color variation when exposed to this specific amount of energy that is easily detectable visually. Parachutes constructed in such a manner readily reveal degrees of degradation since the degradation has been correlated with color or shade changes in the dyestuff itself. Other significant features contemplate special parachute fabrications as well as special techniques for comparing the color change or fading with the initial color of the dyestuff.

DESCRIPTION OF THE PREFERRED EMBODIMENTS

Figure 1:
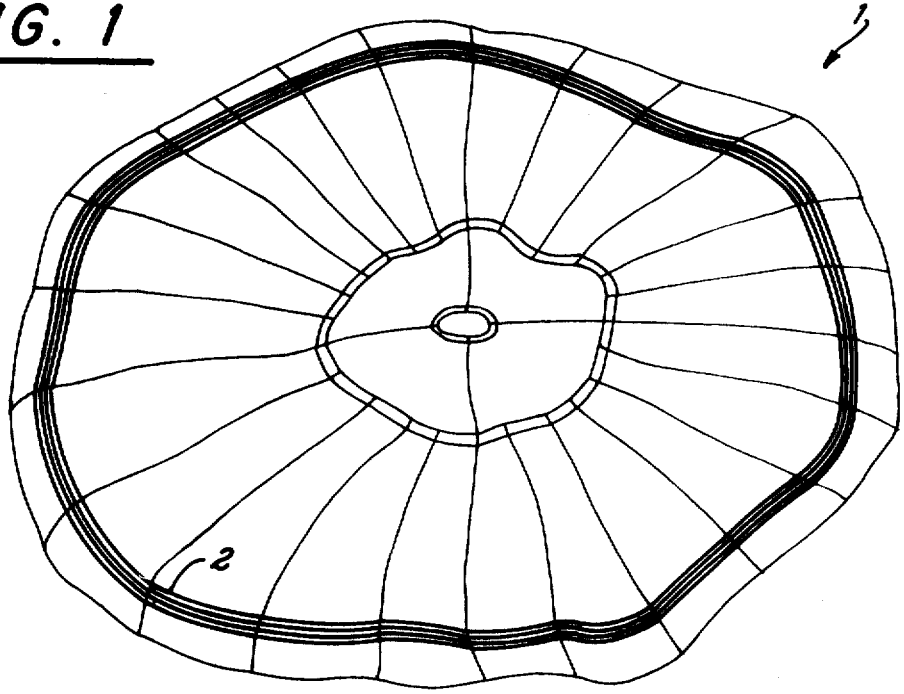
FIG. 1 illustrates a parachute canopy having a particular section incorporating a dyestuff of a color which contrasts with the main body of the canopy.
Figure 2:
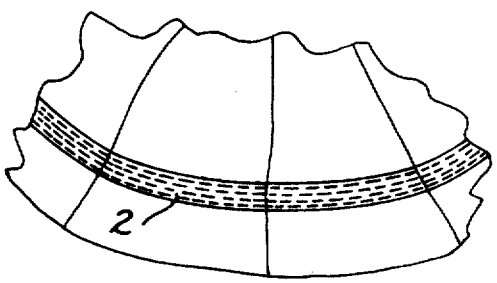
FIG. 2 is a section of the same parachute illustrated in FIG. 1, FIG. 2 illustrating a color variation of the dyestuff after exposure to sunlight.

Referring to FIG. 1, numeral 1 represents a parachute canopy while numeral 2 represents a section incorporating a dyestuff of a particular color. Various dyestuffs of different dye colors may be employed and the criteria affecting their selections will be set forth in subsequent description. The principles of the present invention are particularly applicable to parachute components, such as canopy 1, or to other components, such as the heavier webbings or suspension lines used in conventional parachute construction. However, within limits which will become apparent, the principles of the invention also may be applied to other textile components.

Parachute canopies, as well as the other components, customarily are formed of various types of nylon materials which may vary according to denier per filament, yarn size, bulk, and other factors such as their resistance to light and heat. As is well known, the term nylon applies generically to any long chain polymer having recurring amide groups as integral parts of the main polymer chain, and, in the present description, the term nylon is employed in this generic sense. However, it is recognized that there are other textile materials in which breaking strength degrades in a manner that correlates with exposure to sunlight. Such materials also should be substantially resistant to degradation of breaking strength when exposed to other environmental conditions, such as heat, moisture, artificial light, detergent baths, etc.

One of the principal findings of the present invention is that, when a canopy, such as canopy 1 is exposed to sunlight, there is a sufficiently predictable and reproducible relationship between the degradation in breaking strength produced by the sunlight energy and the color variation of the particular dyestuffs, also produced by sunlight energy, that the strength of the canopy can be determined nondestructively simply by visually detecting the color variation. Reliability of the nondestructive testing has been established through a series of tests in which dyed and undyed samples of 1.1 ounce parachute canopy fabric prepared from nylon Typed 300 and 330 were employed. The following table shows the various dyestuffs used for the different test samples:

1............ Latyl Brilliant Blue BG.
2............ Latyl Brilliant Blue FLW.
3............ Pontamine Fast Turquoise 8 GL.
4............ Pontacyl Brilliant Blue A.
5............ Benzo Azurine G.
6............ Celanthrene Brilliant Blue FFS.
7............ Dupont Victoria Blue B.

The colors below are the same as above with the Celanthrene Nylon Fast Yellow GL added to give a green color).

| Sample No.: | Dyestuffs |
|---|---|
| 1-A | Latyl Brilliant Blue BG. Celanthrene Fast Yellow GL. |
| 2-A | Latyl Brilliant Blue FLW. Celanthrene Fast Yellow GL. |
| 3-A | Pontamine Fast Turquoise 8GL. Celanthrene Fast Yellow GL. |
| 4-A | Pontacyl Brilliant Blue A. Celanthrene Fast Yellow GL. |
| 5-A | Benzo Azurine G. Celanthrene Fast Yellow GL. |
| 7-A | Dupont Victoria Blue B. Celanthrene Fast Yellow GL. |

As will be readily recognized, these particular dyestuffs are well-known products of commercial manufacturers. For example, the Latyl dyestuffs are marketed by E. I. DuPont De Nemours & Company, Inc., the term Latyl being a trademark for a group of finely dispersed dyes developed particularly for coloration of polyester fibers having good light and wet fastness properties The term Pontamine also is a DuPont trademark for a line of direct dying colors for all fabrics. Pontacyl is a DuPont trademark for a line of color developed for wool, nylon, silk and acrylic fiber fabrics. Benzo products are produced by General Analine and Film Corporation, the word Benzo designating a proprietary le of dyestuffs used on cotton, rayon, silk, and other materials. Celanthrene is another DuPont trademark for a group of anthraquinone dyes and DuPont Victoria Blue is still another DuPont product intended for use on materials of the same type. These particular dyestuffs were selected principally because of their color and their adaptability for use on parachute materials. Other dyestuffs are suitable for the present nondestructive testing procedures.

Testing of the dyestuffs was conducted to determine color fastness to sunlight, artificial light, oven heat and washing and also to determine the accompanying degradation of nylon fibers as measured by breaking strength retained after a change in color or tone. Outdoor exposures were made during the summer months in a desert climate and the sunlight energy of the exposures was measured in Langleys (gram calories per square centimeter).

As to the test equipment, an Instron tensile tester, Model TTC, No. 337, was used to determine the degradation of the breaking strength and, as will be appreciated, the use of this equipment amounted to a destructive testing technique for the particular samples. The exposure energy was measured by an Eppley 180°, 50 junction pyrheliometer No. 3926. Samples for natural weathering exposure were placed on racks on an outdoor exposure platform and the samples arranged horizontally instead of at a 45° angle. Oven heat testing was conducted in a Martin Quad air-circulating oven. Other test equipment obviously can be substituted for that used in these particular tests.

Two series of tests were conducted, the first being on the 13 dyestuffs listed in the foregoing table and, in this first group of dyestuffs, testing for breaking strength was done after 10, 100, 200, 400, 600, 800, 1,000, 5,000, and 10,000 Langleys. Based upon the results of the first group of tests, a second group of four selected colors was tested and, in this group, colors were checked for fading while undyed control fabrics were tested for breaking strength at 100, 500, 1,000, 4,000 and 10,000 Langleys, breaking strength of the dyed samples being determined only at the 4,000 Langley exposure.

Figure 7:
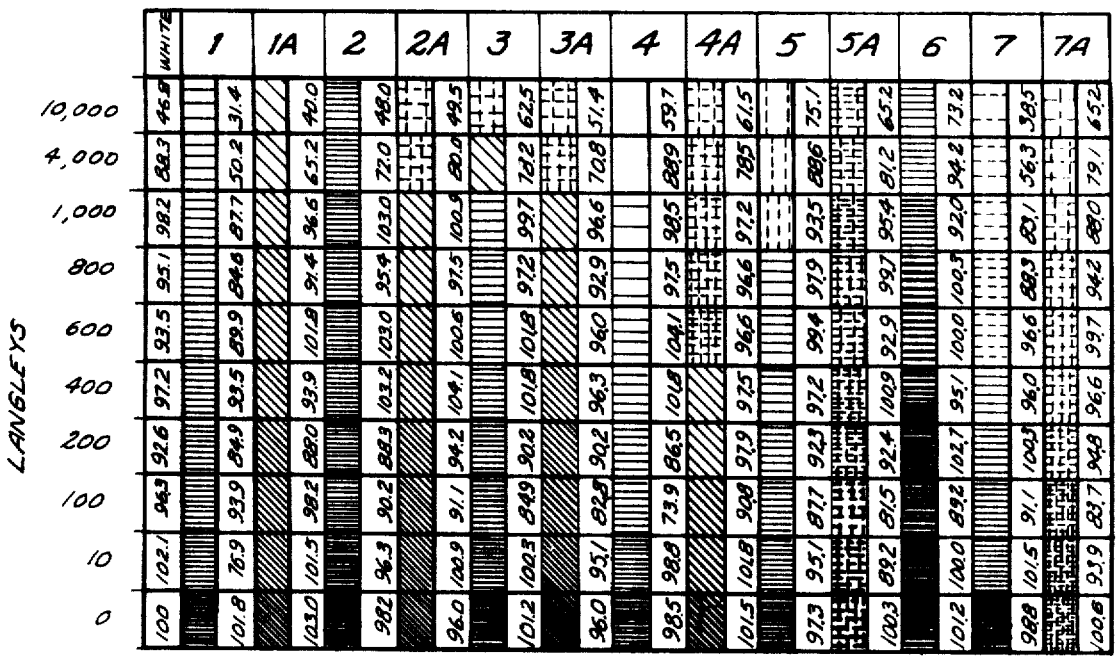
FIGS. 7 and 8 tables showing test results on particular samples.

The results of the first series of tests are provided in FIG. 7 which, as will be noted, provides color and degradation data at each of the exposure levels and Langleys. In this table, as in others, each result recorded is an average of at least three samples and all of the control results are an average of at least five samples. Although some of the data shown in FIG. 7 contains minor inconsistencies, it is apparent that there is a clear correlation, at any particular level of absorbed energy, between the color variation of certain of the dyes and the concurrent degradation in breaking strength of both the dyed and the undyed materials used in the samples.

Figure 8:
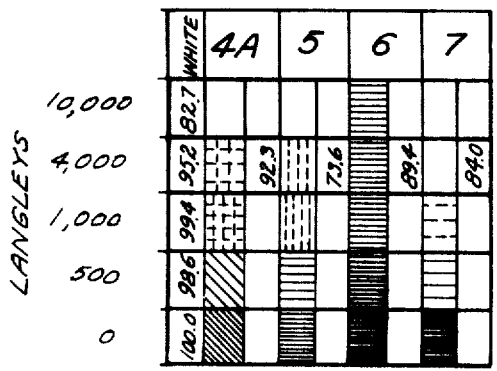

The results of the previously mentioned second series of tests conducted with specifically selected dyes are shown in FIG. 8. As probably is apparent, the strength losses shown in FIG. 8 are those of the undyed samples which accompanied the colored samples during exposure. In this regard, it perhaps should be noted that the colored samples are intended primarily for use as indicators only and not as coloring for complete components. For example, it can be noted in FIGS. 7 and 8 that the dyed samples have a higher degree of degradation than the undyed controls and it consequently is preferred not to fabricate large or vital sections of parachute components from materials dyed with these particular dyestuffs. It further may be noted that FIGS. 7 and 8 reveal differences in strength losses between the first and second series of tests and, where these differences occur, those of the second series are cited since the fabric used in this second test series was of a light and heat resistant type specified for parachute fabric and also of the type having less variation between individual samples. Obviously, in practice, samples employed to determine color changes and degradation in breaking strength must be substantially identical to the actual material used in the component to be tested if reliable percent data is to be obtained. The colors represented by the hatching in FIGS. 7 and 8 of course cannot truly represent the actual color variations produced in the test samples so that the date provided in these tables serves principally to provide an indication of actual conditions, although it is believed that the indication is sufficiently clear to demonstrate the reliable correlation enabling the present nondestructive procedures.

Considering, in particular, the results the following the outdoor exposures in the second test series (FIG. 8) the following analyzes can be made with regard to each of the samples: Sample 4a is a combination of a blue and a yellow dyestuff producing an initial green coloration. This sample turned from green to yellow with a strength loss (in the undyed control) of approximately 1 percent at 1,000 Langleys exposure. It then faded to pale yellow with a 5 percent loss at 4,000 Langleys, and to white with a strength loss of approximately 17 percent at 10,000 Langleys.

Sample 5, which is the blue Benzo Azurine G change to purple after an exposure of 1,000 Langleys with an accompanying strength loss of 1 percent. At 4,000 Langleys exposure, the color was lavender and the strength loss was 5 percent. At 10,000 Langleys, the color was white and the strength loss 17 percent.

Sample 6, the Celanthrene brilliant blue, remained unchanged in color through the 10,000 Langleys exposure with a strength loss of 17 percent in the control fabric. As will be clarified later, since this color is a close match for the color of sample 7, these two dyestuffs are useful as part of a two color comparison system for making degradations or exposure effects apparent.

Sample 7, the DuPont Victorian Blue, gradually faded from blue to white becoming completely white at the 4,000 Langleys exposure with a 5 percent strength loss.

Depending upon the condition of use of the component that is to be tested, it further is desirable to obtain data regarding dye sensitivity and strength loss when exposed to environmental conditions other than sunlight. For example, data regarding color fastness to incandescent light or fluorescent light may be important where the component is subjected to such lighting conditions for a substantial period of time. Also, color fastness to washing and to heat may be significant. To provide such data, the four samples of FIG. 8 were subjected to these other environments. The tests concerned with color fastness to light demonstrated that sample 4a fades very slightly after exposure to both incandescent and fluorescent light with no loss in breaking strength. Sample 5 changed from a blue to a lavender with no breaking strength. Sample 6 remained fast to both types of light again with no loss in breaking strength. Sample 7 changed from a blue to a gray, the strength remaining unchanged. Color fastness to washing was conducted in washing environments of cold water, cold salt water, hot water, at 60° C. and hot water plus a commercial detergent. All samples remained unchanged in color and strength. Color fastness to heat was tested in the oven at 80° C. for 2 hours. Samples 4a, 5 and 6 showed no change in color and no strength loss. Sample 7 showed noticeable fading.

As a result of these various tests, dyestuffs 4a, 5 and 7 appear to be suitable indicators for the detection of canopy degradation. Sample 6 is not sensitive enough to use but can be used in a two color comparison system. For example, sample 6 can be used to form one section of a canopy, while sample 7, which matches sample 6 in original color, can be used in another canopy section. After exposure of the parachute, the degree of fading of sample 7 will become obvious by comparison with the unfaded sample 6. The usefulness of dyestuff of sample 5 and 7 may be limited or enhanced by their sensitivity to the heat and artificial light, depending, of course, upon the exposure which is desired to be detected. Also, the dyestuff used for canopy fabrics may not be suitable for webbing or heavier fabrics in which the degradation of the breaking strength may not be as critical. Thus, a more resistant dyestuff, such as sample 1, 1a, 2, 2a, and others might be more appropriate for use with the heavier webbings.

The test results indicate a definite relationship between color changes during outdoor exposures and loss in breaking strength of textile materials, such as canopy fabrics or the fabrics of other parachute components. The choice of dyestuffs will depend upon the degree of degradation which is desired to be detected and it will be obvious that the preferred dyestuffs will demonstrate a visually detectable color change when the Langleys exposure is sufficiently to produce a degree of breaking strength degradation acceptable for the particular textile material being tested. For example, a degradation and breaking strength of 10 percent or less might be acceptable for parachute canopies so that the dyestuff used to detect this degradation must visually demonstrate a distinct color variation when subjected to the sunlight energy capable of reducing the breaking strength by 10 percent. On the other hand, heavier components such as webbings, can be exposed for much longer periods without degrading beyond an acceptable limit and the dyestuff for these heavier materials might therefore be selected from a group of dyestuffs which are more resistant to color variations.

Detection of color variation can be visually indicated in various manners which are illustrated in FIGS. 1 through 6. For example, in FIGS. 1 and 2, sections 2 might utilize the dyestuffs of samples 5 or 4a. If sample 5 is used, visual detection would depend upon the fading of the blue color to a gray color in the manner intended to be demonstrated in FIG. 2. However, a combination dyestuff, such as sample 4a, might be preferred since the combination of the yellow and blue produced in sample 4a results in a green which, after exposure, changes to a yellow.

Figure 3:
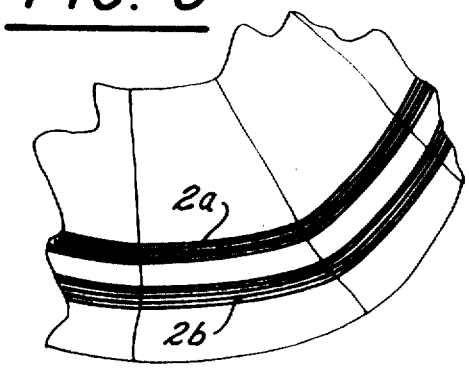
FIG. 3 illustrates a fragmentary portion of another parachute formed with two sections, each incorporating separate dyestuff materials.
Figure 4:
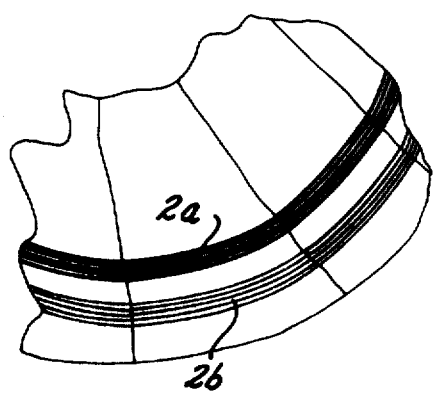
FIG. 4 illustrates the same fragmentary section as FIG. 3 after exposure to sunlight.

FIGS. 3 and 4 show a pair of sections 2a and 2b, both of these sections initially being of the same color. Section 2a, for example, might utilize the blue of sample 6 and section 2b employ the matching blue of sample 7. Since sample 6 is resistant to color change upon exposure, it will remain, as shown in FIG. 4, as a fiducial against which sample 7 can be compared.

Figure 5:
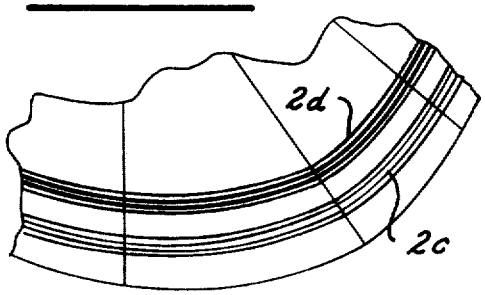
FIG. 5 illustrates a fragmentary portion of the third parachute canopy having two dyed sections of different initial color.
Figure 6:
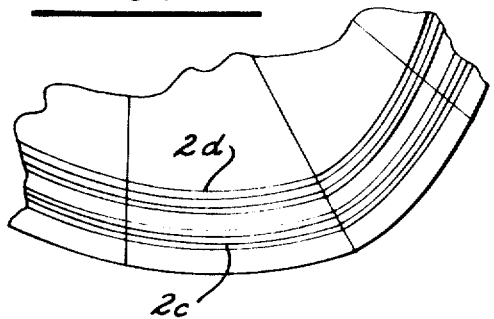
FIG. 6 shows the same fragmentary section as FIG. 5 after exposure to sunlight.

FIGS. 5 and 6 represent another two section technique, section 2c being provided by a dyestuff which is lighter in color than section 2d. However, the dyestuff for section 2c is resistant to color change, while the dyestuff for section 2d is sensitive to color change upon exposure. Preferably, the selection of dyestuffs is made so that when the sensitive section 2d fades, to a color that matches the paler section 2c, the fabric has received sufficient exposure to result in its breaking strength being degraded to the maximum acceptable limit.

The manner in which the dyed sections are incorporated in the components to be tested is a matter of choice, although it is recommended that the dyed yarn forming the section be incorporated into the fabric at the time of the manufacture of the component. When the yarn dyed ends are so incorporated, any degradation which may occur at any point subsequent to initial manufacture will be indicated by a color change of the dyestuff. If desired, however, the sections can be formed by sewing or otherwise securing dyed patches to the parachute component.

Summarizing the procedures and conditions needed for assuring the reliability of the present nondestructive testing method, it first should be emphasized that reliability can be assured only when the textile material is of a type which is substantially resistant to degradation by environmental exposures other than sunlight energy. Also, since both the degradation of breaking strength and the color change most suitably should respond only to sunlight exposure, the preferred dyestuff most suitably is substantially insensitive to other environmental conditions such as heat, artificial light, washing, moisture, etc. However, in the manner already explained, dyestuffs which are sensitive to these other environmental conditions, may be assist in the testing by providing contrast techniques facilitating visual detection in the manner described with reference to FIGS. 3—6.

Before selecting dyestuff, it must first be determined by destructive techniques the actual degree of degradation acceptable for the particular textile material to be used in the component to be tested. Assuming, for example, the acceptable degradation approximates 10 percent of original strength, the next step is to expose a sample of the particular textile material of the component to sunlight and determine quantitatively from the exposure the sunlight energy needed to produce the previously determined maximum degree of acceptable degradation. Utilizing this data, a dyestuff then is selected which has a visually detectable color variation when exposed to the specific amount of energy, which, empirically, produces the degree of degradation. Having selected the dyestuff it then is incorporated into the component and its color change noted after periods of use.

The advantages of the present testing procedures become most apparent when it is considered that previous determinations relative to the degradation of breaking strength have been based almost entirely on guesswork. The objective of any testing, of course, is to know when a parachute is no longer sufficiently strong to be used and therefore must be taken out of service. Prior practices made this determination principally by assuming that a parachute which had been in service for a particular length of time no longer was suitable for use. The present nondestructive testing provides a far more reliable basis for a determination and it permits the user of the parachute to readily determine without the need of any special skills the continued safety factors of the 'chute. In contrast, determinations based upon the length of service to which any particular parachute has been subjected require a knowledge of the liftime history of the particular chute and, of course, records of this type are not readily available in the field. The present nondestructive testing method is not to be construed as an absolutely precise and minutely accurate manner of determining precise degradation. However, it does provide a sufficient close approximation of adequately reliability for field use, and employment of the method clearly results both in increased economies and in reduced risks.

Obviously many modifications and variations of the present invention are possible in the light of the above teachings. It is therefore to be understood that within the scope of the appended claims the invention may be practiced otherwise than as specifically described.

What I claim is:

1. A nondestructive method for testing breaking strength degradation of parachute components formed of a textile material said method comprising;
   combining with a small section of said textile material a dyestuff having a known color variation characteristic when exposed to sunlight, determining the degree of degradation by said detected color variation.

2. A nondestructive method of testing the breaking strength degradation of a parachute component formed of a textile material of a type substantially resistant to degradation by environmental exposures other than sunlight energy, the method comprising:

subjecting the textile of a particular parachute component to destructive testing for determining a degree of degradation acceptable for the particular textile material used in said component to be tested, exposing said particular textile material to sunlight, determining from said exposure the specific amount of energy required to degrade said particular textile material to said acceptable degree, selecting a dyestuff of a particular color and having visually detectable color variation when exposed to said specific amount of energy, combining said dyestuff with at least a section of said particular parachute component to be tested, and comparing the color of said particular component section after said exposure with said particular initial color for determining the degree of degradation.

3. The method of claim 2 wherein said component initially is fabricated of interwoven fibers at least a portion of which are dyed with said dyestuff for providing said component with a colored section at the time of said fabrication.

4. The method of claim 3 wherein said dyestuff is a combination of an ultra-violet sensitive dye with an ultra-violet resistant dye, said combination producing an initial color different from either of said dyes and being capable of a visible color change upon exposure to said specific amount of energy, said color change being produced by a color variation in said ultra-violet sensitive dye, whereby said degree of degradation is determinable by said color change.

5. The method of claim 3 wherein said component is formed with at least two sections each of substantially the same initial color, each of the sections being formed with a different dyestuff for producing said color, one of said different dyestuffs being ultra-violet sensitive and the other being ultra-violet resistant whereby said degree of degradation is visually detectable by comparing said section colors after exposure to said sunlight energy.

6. The method of claim 3 wherein said component is formed with at least two sections, each of said sections being formed with a different dyestuff, one of said dyestuffs being ultra-violet resistant and having a particular color, and the other of said dyestuffs being ultra-violet sensitive and being characterized by the fact that its exposure to said specific amount of energy produces a color variation resulting in a color match with said particular color of said one dyestuff.

7. Parachute apparatus including:

a component formed of a woven nylon-type textile, an ultra-violet sensitive dyestuff combined with at least a small section of said component, said dyestuff being of a particular color and having a visually detectable color variation when exposed to a specific amount of sunlight energy capable of degrading the breaking strength of said textile a minimum acceptable degree.

8. The parachute apparatus of claim 7 wherein said component initially is fabricated of interwoven fibers at least a portion of which are dyed with said dyestuff to provide a section colored with said particular color.

9. The parachute apparatus of claim 7 wherein different dyestuffs are combined one with one section of the component and another with another section;

said dyestuffs having substantially the same initial color, said dyestuffs having differing degrees of sensitivity to sunlight energy whereby degradation of breaking strength is detectable by color variations produced upon exposure to said energy.

10. The parachute apparatus of claim 6 wherein said dyestuff is a combination of an ultra-violet sensitive dye with an ultra-violet resistant dye, said combination producing an initial color different from either of said dyes and being capable of a visible color change upon exposure to said specific amount of energy, said color change being produced by a color variation in said ultra-violet sensitive dye, whereby said minimum degree of degradation is determinable by said color change.

11. The parachute apparatus of claim 7 wherein said section of the parachute is a separate piece of textile which is attached to the parachute.